United States Patent [19]

Omura et al.

[11] Patent Number: 5,504,234

[45] Date of Patent: Apr. 2, 1996

[54] METHOD FOR THE PREPARATION OF (METH)ACRYLOXYALKYL GROUP-CONTAINING LINEAR ORGANOPOLYSILOXANE

[75] Inventors: Naoki Omura; Toshio Ohba; Shinji Irifune, all of Gunma, Japan

[73] Assignee: Shin-Etsu Chemical Co., Ltd., Tokyo, Japan

[21] Appl. No.: 451,143

[22] Filed: May 26, 1995

[30] Foreign Application Priority Data

May 30, 1994 [JP] Japan ..................................... 6-116254

[51] Int. Cl.$^6$ .................................................. C07F 7/08
[52] U.S. Cl. ............................................................ 556/439
[58] Field of Search ................................................ 556/439

[56] References Cited

U.S. PATENT DOCUMENTS

| | | | |
|---|---|---|---|
| 2,875,177 | 2/1959 | Bluestein | 556/439 X |
| 3,464,955 | 9/1969 | Bluestein | 556/439 X |
| 4,652,662 | 3/1987 | von Au et al. | 556/439 X |
| 5,239,085 | 8/1993 | Enami et al. | 556/439 X |
| 5,332,796 | 7/1994 | Yoshikawa et al. | 556/439 X |

*Primary Examiner*—Paul F. Shaver
*Attorney, Agent, or Firm*—Millen, White, Zelano & Branigan

[57] ABSTRACT

A novel method is disclosed for the preparation of a (meth-)acryloxyalkyl group-containing organopolysiloxane having a linear structure by the ring-opening siloxane rearrangement polymerization reaction of a (meth)acryloxyalkyl group-containing cyclic organopolysiloxane oligomer either alone or in combination with a cyclic organopolysiloxane oligomer having no (meth)acryloxyalkyl groups. Different from conventional acidic catalyst, the reaction can be promoted by the use of a cation-exchange resin in the H$^+$ form which can be readily removed from the polymerization mixture after completion of the polymerization reaction leaving no acidic matter which influences on the stability of the product. The catalytic efficiency of the cation-exchange resin can be further enhanced when the resin is, prior to contacting with the cyclic organopolysiloxane oligomer(s), impregnated or swollen with a polar organic solvent such as tetrahydrofuran.

15 Claims, No Drawings

METHOD FOR THE PREPARATION OF (METH)ACRYLOXYALKYL GROUP-CONTAINING LINEAR ORGANOPOLYSILOXANE

BACKGROUND OF THE INVENTION

The present invention relates to a method for the preparation of a (meth)acryloxyalkyl group-containing organopolysiloxane of a linear molecular structure or, more particularly, to a method for the preparation of a (meth)acryloxyalkyl group-containing organopolysiloxane of a linear molecular structure by the ring-opening siloxane rearrangement polymerization reaction of a cyclic organopolysiloxane oligomer having (meth)acryloxyalkyl groups bonded to the silicon atoms.

As is well known, (meth)acryloxyalkyl group-containing organopolysiloxane of a linear molecular structure is a useful silicone material, for example, as the principal ingredient in a surface-release coating agent by effecting polymerization at the (meth)acrylic groups. A (meth)acryloxyalkyl group-containing organopolysiloxane of a linear molecular structure is conventionally prepared by the ring-opening siloxane rearrangement polymerization reaction of a cyclic organopolysiloxane oligomer having (meth)acryloxyalkyl groups bonded to the silicon atoms either alone or as a mixture with another cyclic organopolysiloxane oligomer having no (meth)acryloxyalkyl groups in the presence of an acid as a catalyst followed by neutralization of the acidic catalyst with a basic compound. This method of acid-catalyzed polymerization reaction has some problems and disadvantages. For example, neutralization reaction of an acid with a basic compound is necessarily accompanied by the formation of water as a reaction product while water in the (meth)acryloxyalkyl group-containing organopolysiloxane acts as a hydrolyzing agent on the (meth)acrylic ester groups in the presence of an acidic or basic compound so as to cause a decrease in the effective content of the (meth)acryloxyalkyl groups as the functional groups in the organopolysiloxane product. Moreover, the above mentioned hydrolysis reaction of the ester groups eventually leads to the formation of microgels which cause a great decrease in the filtrability of the reaction product due to clogging of the filter paper or cloth when it is subjected to filtration to remove the salt formed by the neutralization reaction and other solid materials.

SUMMARY OF THE INVENTION

The present invention accordingly has an object to provide a novel and improved method for the preparation of a (meth)acryloxyalkyl group-containing organopolysiloxane having a straightly linear molecular structure by the ring-opening siloxane rearrangement polymerization reaction of a cyclic organopolysiloxane oligomer having (meth)acryloxyalkyl groups bonded to the silicon atoms either alone or as a mixture with another cyclic organopolysiloxane oligomer having no (meth)acryloxyalkyl groups, according to which neutrality of the (meth)acryl-oxyalkyl group-containing organopolysiloxane as the product can be ensured even without neutralization of the reaction mixture with a basic or alkaline neutralizing agent and no decrease is caused in the filtrability of the reaction mixture as a consequence of absolute absence of neutralization water to cause hydrolysis in the reaction mixture.

Thus, the method of the present invention for the preparation of a (meth)acryloxyalkyl group-containing organopolysiloxane having a linear molecular structure comprises the steps of: (A) admixing (a) a (meth)acryloxyalkyl-containing cyclic organopolysiloxane oligomer represented by the general formula

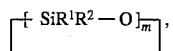, (I)

in which $R^1$ is a monovalent hydrocarbon group, $R^2$ is $R^1$ or a (meth)acryloxyalkyl group of the formula

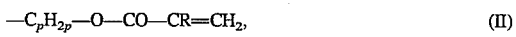 (II)

R being a hydrogen atom or a methyl group and the subscript p being a positive integer of 1 to 6, and the subscript m is a positive integer of 3 to 10, at least 50% by moles of the groups denoted by $R^2$ being the (meth)acryloxyalkyl groups of the formula (II), either alone or as a mixture with (b) a cyclic organopolysiloxane oligomer represented by the general formula

 (III)

in which $R^1$ has the same meaning as defined above and the subscript n is a positive integer of 3 to 10, with (c) a cation-exchange resin in the $H^+$ form to give a blend as a polymerization mixture; (B) heating the polymerization mixture at a temperature of 50° C. or higher to effect the ring-opening siloxane rearrangement polymerization reaction of the cyclic organopolysiloxane oligomer or oligomers; and (C) removing the cation-exchange resin from the polymerization mixture.

In particular, the catalytic activity of the cation-exchange resin can be further enhanced when the resin is impregnated with a polar organic solvent before being brought into contact with the cyclic organopolysiloxane oligomer or oligomers.

DETAILED DESCRIPTION OF THE PREFERRED EMBODIMENTS

As is described above, the most characteristic feature in the inventive method consists in the use of a cation-exchange resin in the $H^+$ form as a catalyst for the ring-opening siloxane rearrangement polymerization reaction of the cyclic organopolysiloxane oligomer or oligomers in place of conventional acids as an acidic catalyst. After completion of the polymerization reaction, the cation-exchange resin can be easily removed from the reaction mixture by filtration leaving no acidic matter dissolved in the reaction mixture so that neutrality of the organopolysiloxane product can be ensured even without undertaking the neutralization treatment of the acidic catalyst with a basic compound as is indispensable in the prior art methods.

The method of the present invention is basically a ring-opening siloxane rearrangement polymerization reaction of a cyclic organopolysiloxane oligomer which essentially contains at least 25% by moles of the (meth)acryloxyalkyl groups, i.e. acryloxyalkyl groups and/or methacryloxyalkyl groups, bonded to the silicon atoms in a molecule based on the overall organic groups bonded to the silicon atoms as the component (a), optionally, as a mixture with a cyclic organopolysiloxane oligomer having no silicon-bonded (meth)acryloxyalkyl groups as the component (b) defined above. When a mixture of the oligomers (a) and (b) is subjected to the polymerization reaction, the weight proportion of the component (a) should be at least 0.1% based on the amount of the mixture since, when the proportion of the component (a) is too small, the linear organopolysiloxane obtained as the product has no particular functional merit over conventional diorganopolysiloxanes such as dimethyl polysiloxanes containing no (meth)acrylic functional groups.

The above mentioned (meth)acryloxyalkyl group-containing cyclic organopolysiloxane oligomer as the component (a) is typically a cyclic oligomer, of which each of the siloxane units is a methyl 3-(meth)acryloxypropyl siloxane unit, expressed by the formula

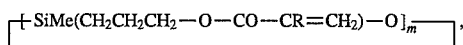

in which Me is a methyl group, R is a hydrogen atom or a methyl group and the subscript m is a positive integer of 3 to 10 or, in particular, 3 to 6. A typical example of the cyclic oligomer as the component (a) is 1,3,5,7-tetramethyl-1,3,5,7-tetra(3-acryloxypropyl) cyclotetrasiloxane. This cyclic oligomer as the component (a) can be copolymerized, if necessary, as is mentioned above, with another cyclic organopolysiloxane oligomer having no (meth)acrylic groups exemplified by octamethyl cyclotetrasiloxane, vinyl heptamethyl cyclotetrasiloxane, phenyl heptamethyl cyclotetrasiloxane and the like.

In step (A) of the inventive method, the above described cyclic organopolysiloxane oligomer or oligomers are blended with a cation-exchange resin in the $H^+$ form as the component (c) to give a polymerization mixture. The cation-exchange resin is preferably of the so-called dry type containing no or only little amount of water. In particular, the water content in the cation-exchange resin is preferably such that the weight loss of the resin by drying at 105° C. for 3 hours does not exceed 5% by weight. When the cation-exchange resin contains an unduly large amount of water, difficulties are caused in the control of the reaction because of the instantaneous initiation of the polymerization reaction even at room temperature as the cation-exchange resin is introduced into the cyclic organopolysiloxane oligomer in addition to the possible hydrolysis of the (meth)acrylic ester groups in the presence of water.

Various grades of commercial products of dry-type cation-exchange resins are available on the market and can be used as such including Amberlyst 15 E Dry manufactured by Rohm & Haas Co. and Purolites CT-165, CT-169, CT-171DR and CT-175 manufactured by Purolite Co. Pore diameter and pore volume of the resin have some influences on the efficiency thereof as a catalyst and, in these regards, macroporous-type cation-exchange resins such as Purolite CT-175 are preferred due to their relatively large pore diameter and pore volume. For example, Purolite CT-175 has a pore diameter of 50 to 70 nm and a pore volume of 0.49 ml/g according to the manufacturer and is preferred to Amberlyst 15E Dry having a pore diameter of 20 to 60 nm and a pore volume of 0.36 ml/g.

The amount of the above described cation-exchange resin in the polymerization mixture is in the range from 2 to 10% by weight or, preferably, from 3 to 5% by weight based on the amount of the cyclic organopolysiloxane oligomer or oligomers. When the amount of the cation-exchange resin is too small, the velocity of the polymerization reaction cannot be high enough as a matter of course while, when the amount thereof is too large, a substantial amount of the diorganopolysiloxane product adheres to the resin particles and cannot be recovered as the product resulting in a decrease in the product yield with no particular additional advantages in the velocity of polymerization and in other respects.

Besides the above described cyclic organopolysiloxane oligomer or oligomers, it is optional that the polymerization mixture is admixed with an oligomeric diorganopolysiloxane or, in particular, dimethyl polysiloxane terminated at each molecular chain end with a trimethyl silyl group or dimethyl (meth)acryloxyalkyl silyl group with an object to provide terminal groups to the linear diorganopolysiloxane product. It is sometimes advantageous that the polymerization mixture is admixed with a radical-polymerization inhibitor such as BHT, N,N'-diphenyl 1,4-phenylenediamine and the like with an object to prevent premature polymerization of the (meth)acrylic groups in the course of the ring-opening polymerization of the cyclic organopolysiloxane oligomers.

The polymerization mixture prepared by mixing the above described essential and optional ingredients is then, in step (B) of the inventive method, heated under agitation at a temperature of 50° C. or higher or, preferably, in the range from 90° to 100° C. for a length of time, usually, in the range from 8 to 12 hours to effect the ring-opening polymerization of the cyclic oligomer or oligomers. In step (C) of the inventive method, thereafter, the linear diorganopolysiloxane thus formed in the reaction mixture is freed from the beads of the cation-exchange resin by filtration using, for example, a metal wire screen of suitable mesh openings. No particular difficulties are encountered in this filtration treatment.

It has been discovered that, when the (meth)acryloxyalkyl group-containing cyclic oligomer as the component (a) contains the (meth)acryloxyalkyl groups in a high content or, namely, almost 50% by moles of the organic groups in the component (a) are the (meth)acryloxyalkyl groups, the component (b) is poorly miscible with such a component (a) so that the ring-opening polymerization cannot proceed smoothly to such an extent that an equilibrium is established in the linear organopolysiloxane molecules produced in the ring-opening polymerization of the cyclic oligomers by the catalytic activity of the cation-exchange resin so that the final product of the linear organopolysiloxane is sometimes inhomogeneous and has a cloudy appearance.

The inventors have conducted extensive investigations with an object to solve this problem and unexpectedly arrived at a discovery that the catalytic efficiency can be greatly improved even in such a case when the polymerization mixture is admixed with a polar organic solvent or, preferably, the beads of the cation-exchange resin as the component (c) are impregnated with a polar organic solvent prior to contacting with the cyclic organopolysiloxane oligomer or oligomers. The term "impregnation" here implied does not mean that it is necessary that a substantial portion of the polar solvent is absorbed in the beads of the cation-exchange resin but the solvent can be merely wetting the resin beads. Examples of suitable polar organic solvents include those having one or more of oxygen atoms in a molecule exemplified by oxygen-containing heterocyclic compounds such as tetrahydrofuran and dioxane, linear ethers such as diethyl ether, diglyme and triglyme, amide compounds such as dimethyl formamide and dimethyl acetamide, sulfoxides such as dimethyl sulfoxide, ketones such as acetone and methyl ethyl ketone and esters such as ethyl acetate and methyl acetate, of which tetrahydrofuran and dioxane are particularly preferable. Non-polar organic solvents should not be used because of the decrease in the catalytic activity of the cation-exchange resin resulting in a decrease of the product yield. Although the mechanism leading to this unexpected improvement is still not well understood, it is presumable that the cation-exchange resin beads are more or less swollen with the solvent so as to increase the accessibility of the organopolysiloxane molecules to the effective sites on the surface of the porous resin beads so that the catalytic efficiency of the resin beads can be enhanced.

The amount of the polar organic solvent is in the range from 100% to 1000% or, preferably, from 150% to 200% by weight based on the amount of the cation-exchange resin. When the amount of the polar organic solvent is too small, the beads of the cation-exchange resin cannot be fully impregnated therewith while, when the amount thereof is too large, a substantial amount of the polar organic solvent is intermixed with the starting materials resulting in a decrease in the concentration of the reactants so that retardation is caused in the velocity of the polymerization reaction and eventual decrease in the yield of the product.

The cation-exchange resin recovered by separating from the polymerization mixture by filtration can be re-used as such in the next run of the polymerization reaction. It has been discovered that the catalytic activity of the thus recovered cation-exchange resin can be more fully regained by washing the resin beads separated from the polymerization mixture of the previous run with a polar organic solvent as completely as possible or, for example, with the polar organic solvent in an at least equal amount to the resin so that the resin is freed from the adhering organopolysiloxane. The organopolysiloxane dissolved away from the resin beads by washing can be recovered by removing the solvent from the washings under reduced pressure so that no decrease is caused in the yield of the product due to washing of the cation-exchange resin with a polar organic solvent.

In the following, the method of the invention is described in more detail by way of examples, which, however, never limit the scope of the invention in any way.

In the following examples, the filtrability of the organopolysiloxane product as polymerized was evaluated by the following testing procedure. Thus, a 100 g portion of the sample fluid was taken in a cylindrical filter of 55 mm inner diameter (a product by Advantech Toyo Co.) and subjected to test filtration through a sheet of filter paper (NA-500, a product by Toyo Filter Paper Co.) under a pressure of 2 kg/cm$^2$ to record the time taken for completion of filtration of the whole amount of the sample fluid.

EXAMPLE 1.

Into a 500 ml flask equipped with a reflux condenser, stirrer and thermometer were introduced 123.84 g (0.72 mole as the diorgano siloxane units) of a cyclic oligomer mixture of methyl 3-acryloxypropyl siloxane having a degree of polymerization of 3 to 6, which was a clear and colorless liquid obtained by the hydrolysis of 3-acryloxypropyl methyl dimethoxy silane and had a viscosity of 130 centipoise at 25° C. and a refractive index of 1.464, 236.8 g (3.2 moles as the dimethyl siloxane units) of octamethyl cyclotetrasiloxane, 12.08 g (0.04 mole) of 1,3-di(acryloxymethyl)-1,1,3,3-tetramethyl disiloxane and 11.2 g, corresponding to 3% by weight of the total amount of the organopolysiloxanes as the starting materials, of a cation-exchange resin (Amberlyst 15E Dry, supra) to form a polymerization mixture, which was heated under agitation at 90° C. for 8 hours.

The thus obtained mixture after polymerization was filtered through a stainless steel screen of 150 mesh openings to give a liquid organopolysiloxane free from the resin beads, which was cloudy but neutral even without undertaking any neutralization treatment. The filtrability test of this fluid gave a filtration time of 30 minutes according to the above described testing procedure. The fluid was subjected to stripping at 130° C. for 4 hours under bubbling of air therethrough to give an oily organopolysiloxane product having a viscosity of 332 centipoise at 25° C. and a refractive index of 1.425. The yield of the product was 85% based on the total amount of the starting organopolysiloxane compounds.

EXAMPLE 2.

The experimental procedure was substantially the same as in Example 1 described above excepting use of another cation-exchange resin (Purolite CT-175, supra) in place of Amberlyst 15E Dry. The polymerization mixture after completion of the reaction time was also neutral even without undertaking any neutralization treatment and cloudy as freed from the cation-exchange resin by filtration. The filtrability test of the fluid indicated that the time taken for the filtration was 23 minutes. The oily organopolysiloxane product after removal of the volatile matter by stripping had a viscosity of 304 centipoise at 25° C. and a refractive index of 1.426. The yield of the product was 86% based on the total amount of the starting organopolysiloxane compounds.

EXAMPLES 3 to 5.

The experimental procedure in each of Examples 3, 4 and 5 was substantially the same as in Example 2 except that 11.2 g of the cation-exchange resin were, before introduction into the mixture of the starting organopolysiloxane compounds, impregnated with 7.45 g, 18.7 g and 37.3 g, respectively, of tetrahydrofuran. The weight proportions of the solvent to the cation-exchange resin were 0.67 time, 1.67 times and 3.33 times, respectively. The amount of tetrahydrofuran in Example 3 was insufficient to effect full swelling of the resin beads. In Example 4, it was noted that the resin beads were fully swollen with tetrahydrofuran while, in Example 5, a substantial portion of the solvent remained free without being absorbed by the resin beads. The reaction product after removal of the cation-exchange resin was slightly cloudy in Example 3 but clear and colorless in each of Examples 4 and 5. The reaction products were neutral even without undertaking any neutralization treatment.

Table 1 below shows the filtration time taken in the filtrability test of the reaction products and the yield, viscosity at 25° C. and refractive index of the organopolysiloxane products after stripping to remove volatile matters.

TABLE 1

| Example No. | 3 | 4 | 5 |
|---|---|---|---|
| Filtrability, minutes | 19 | 7.5 | 13 |
| Yield, % | 85 | 86 | 80 |
| Viscosity, centipoise | 359 | 276 | 274 |
| Refractive index | 1.426 | 1.427 | 1.433 |

EXAMPLE 6.

The experimental procedure was substantially the same as in Example 2 except that mixing of 11.2 g of the cation-exchange resin with the starting organopolysiloxane compounds was followed by the admixture of the polymerization mixture with 18.7 g of, or 1.67 times by weight based on the resin, of tetrahydrofuran and thorough agitation. The liquid polymerization product after removal of the cation-exchange resin had cloudy appearance but was neutral even without undertaking any neutralization treatment and the filtrability test thereof gave a filtration time of 10 minutes. The oily organopolysiloxane product obtained by removing volatile matters had a viscosity of 330 centipoise at 25° C. and a refractive index of 1,432. The yield of this product was 75%.

EXAMPLE 7.

The experimental procedure was substantially the same as in Example 4 excepting replacement of the tetrahydrofuran with the same amount of acetone. The liquid polymerization product after removal of the cation-exchange resin had clear and yellowish appearance but was neutral even without undertaking any neutralization treatment. The filtrability test thereof gave a filtration time of 10 minutes. The oily organopolysiloxane product obtained by removing volatile matters had a viscosity of 263 centipoise at 25° C. and a refractive index of 1.427. The yield of this product was 86%.

EXAMPLE 8.

The experimental procedure was substantially the same as in Example 1 excepting replacement of 11.2 g of the cation-exchange resin (Amberlyst 15E Dry) with 18.7 g of another cation-exchange resin (Purolite CT-175, supra) impregnated beforehand with 35.5 g of tetrahydrofuran. The liquid polymerization product after removal of the cation-exchange resin had clear and colorless appearance and was neutral even without undertaking any neutralization treatment. The filtrability test thereof gave a filtration time of 6 minutes. The oily organopolysiloxane product obtained by removing volatile matters had a viscosity of 293 centipoise at 25° C. and a refractive index of 1.425. The yield of this product was 73%.

EXAMPLE 9.

The experimental procedure was substantially the same as in Example 8 except that, instead of using a fresh cation-exchange resin, the cation-exchange resin used here was that separated and recovered from the polymerization mixture after the polymerization reaction in Example 8 followed by twice of washing with 50 g of tetrahydrofuran and impregnation with 30 g of the same solvent. The liquid polymerization product after removal of the cation-exchange resin had clear and colorless appearance and was neutral even without undertaking any neutralization treatment. The filtrability test thereof gave a filtration time of 6 minutes. The oily organopolysiloxane product obtained by removing volatile matters had a viscosity of 295 centipoise at 25° C. and a refractive index of 1.426. The yield of this product was 80%.

EXAMPLE 10.

The experimental procedure was substantially the same as in Example 8 except that, instead of using a fresh cation-exchange resin, the cation-exchange resin used here was that separated and recovered from the polymerization mixture after the polymerization reaction in Example 9 followed by two washings with 50 g of tetrahydrofuran and impregnation with 30 g of the same solvent. The liquid polymerization product after removal of the cation-exchange resin had clear and colorless appearance and was neutral even without undertaking any neutralization treatment. The filtrability test thereof gave a filtration time of 6 minutes. The oily organopolysiloxane product obtained by removing volatile matters had a viscosity of 253 centipoise at 25° C. and a refractive index of 1.426. The yield of this product was 81%.

EXAMPLE 11.

The experimental procedure was substantially the same as in Example 8 except that, instead of using a fresh cation-exchange resin, the cation-exchange resin used here was that separated and recovered from the polymerization mixture after the polymerization reaction in Example 10 followed by two washings with 50 g of tetrahydrofuran and impregnation With 30 g of the same solvent. The liquid polymerization product after removal of the cation-exchange resin had clear and colorless appearance and was neutral even without undertaking any neutralization treatment. The filtrability test thereof gave a filtration time of 6 minutes. The oily organopolysiloxane product obtained by removing volatile matters had a viscosity of 312 centipoise at 25° C. and a refractive index of 1.427. The yield of this product was 75.

EXAMPLE 12.

The experimental procedure was substantially the same as in Example 8 except that, instead of using a fresh cation-exchange resin, the cation-exchange resin used here was that separated and recovered from the polymerization mixture after the polymerization reaction in Example 8 without washing and impregnation with fresh tetrahydrofuran. The liquid polymerization product after removal of the cation-exchange resin had cloudy appearance but was neutral even without undertaking any neutralization treatment. The filtrability test thereof gave a filtration time of 13 minutes. The oily organopolysiloxane product obtained by removing volatile matters had a viscosity of 325 centipoise at 25° C. and a refractive index of 1.433. The yield of this product was 74%.

EXAMPLE 13.

The experimental procedure was substantially the same as in Example 4 except that 123.84 g of the cyclic 3-acryloxypropyl methyl polysiloxane oligomer were replaced with 133.9 g, or the same molar amount as the diorganosiloxane units, of a cyclic 3-methacryloxypropyl methyl polysiloxane oligomer having a viscosity of 150 centipoise at 25° C. The liquid polymerization product after removal of the cation-exchange resin had clear and colorless appearance and was neutral even without undertaking any neutralization treatment. The filtrability test thereof gave a filtration time of 12 minutes. The oily organopolysiloxane product obtained by removing volatile matters had a viscosity of 321 centipoise at 25° C. and a refractive index of 1,429. The yield of this product was 88%.

Comparative Example 1.

The experimental procedure was substantially the same as in Example 4 excepting replacement of 11.2 g of the cation-exchange resin as the catalyst with 3.72 g, or 1% by weight based on the total amount of the starting organopolysiloxane compounds, of methane sulfonic acid. The liquid polymerization product thus obtained had clear and colorless appearance but was acidic before undertaking a neutralization treatment. The filtrability test thereof gave a filtration time of 42 minutes. The oily organopolysiloxane product obtained by removing volatile matters had a viscosity of 252 centipoise at 25° C. and a refractive index of 1,426. The yield of this product was 85%.

What is claimed is:

1. A method for the preparation of a (meth)acryloxyalkyl group-containing organopolysiloxane having a linear molecular structure which comprises the steps of:
   (A) admixing (a) first cyclic organopolysiloxane oligomer which is a (meth)acryloxyalkyl-containing cyclic organo-polysiloxane oligomer represented by the general formula

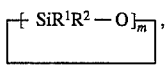

in which $R^1$ is a monovalent hydrocarbon group, $R^2$ is $R^1$ or a (meth)acryloxyalkyl group of the formula

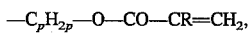

R being a hydrogen atom or a methyl group and the subscript p being a positive integer of 1 to 6, and the subscript m is a positive integer of 3 to 10, at least 50% by moles of the groups denoted by $R^2$ being the (meth)acryloxyalkyl groups, or a mixture of first cyclic organopolysiloxane oligomers as the component (a) and (b) a second cyclic organopolysiloxane oligomer represented by the general formula

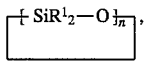

in which $R^1$ has the same meaning as defined above and the subscript n is a positive integer of 3 to 10, with (c) a cation-exchange resin in the $H^+$ form to give a blend as a polymerization mixture;
   (B) heating the polymerization mixture at a temperature of 50° C. or higher to effect ring-opening siloxane rearrangement polymerization reaction of the cyclic organopolysiloxane oligomer or oligomers; and
   (C) removing the cation-exchange resin from the polymerization mixture.

2. The method for the preparation of a (meth)acryloxyalkyl group-containing organopolysiloxane having a linear molecular structure as claimed in claim 1 in which the cation-exchange resin is a dry-type cation exchange resin exhibiting a weight loss not exceeding 5% by weight by heating at 105° C. for 3 hours.

3. The method for the preparation of a (meth)acryloxyalkyl group-containing organopolysiloxane having a linear molecular structure as claimed in claim 1 in which the amount of the cation-exchange resin is in the range from 2 to 10% by weight based on the amount of the first cyclic organopolysiloxane oligomer or the mixture of the mixture of the first and second cyclic organopolysiloxane oligomers.

4. The method for the preparation of a (meth)acryloxyalkyl group-containing organopolysiloxane having a linear molecular structure as claimed in claim 1 in which the cation-exchange resin is, prior to mixing with the first cyclic organopolysiloxane oligomer or the mixture of the first and second cyclic organopolysiloxane oligomers, impregnated with a polar organic solvent.

5. The method for the preparation of a (meth)acryloxyalkyl group-containing organopolysiloxane having a linear molecular structure as claimed in claim 4 in which the polar organic solvent is an organic compound having at least one oxygen atom in a molecule.

6. The method for the preparation of a (meth)acryloxyalkyl group-containing organopolysiloxane having a linear molecular structure as claimed in claim 5 in which the polar organic solvent is selected from the group consisting of oxygen-containing saturated heterocyclic compounds, ethers, amides, sulfoxides, ketones and esters.

7. The method for the preparation of a (meth)acryloxyalkyl group-containing organopolysiloxane having a linear molecular structure as claimed in claim 5 in which the polar organic solvent is tetrahydrofuran or dioxane.

8. The method for the preparation of a (meth)acryloxyalkyl group-containing organopolysiloxane having a linear molecular structure as claimed in claim 5 in which the amount of the polar organic solvent is in the range from 100% to 1000% by weight based on the amount of the cation-exchange resin.

9. The method for the preparation of a (meth)acryloxyalkyl group-containing organopolysiloxane having a linear molecular structure as claimed in claim 8 in which the amount of the polar organic solvent is in the range from 150% to 200% by weight based on the amount of the cation-exchange resin.

10. The method of claim 1, wherein the amount of oligomer (a) is at least 0.1% by weight based on the mixture of oligomers (a) and (b).

11. The method of claim 1, wherein (a) is an oligomer of the recited formula wherein $R^1$ is methyl and $R^2$ is a (meth)acryloxyalkyl group.

12. The method of claim 1, wherein in step (A) the oligomers are further mixed with a linear oligomeric diorganopolysiloxane, optionally, terminated at each molecular chain end with a trimethylsilyl group or a dimethyl-(meth)acryloxyalkylsilyl group.

13. The method of claim 1, wherein the heating of step (B) is at 90° to 100° C.

14. The method of claim 13, wherein the heating is for 8 to 12 hours.

15. The method of claim 1, wherein the removal of the cation-exchange resin in step (C) is by filtration.

* * * * *